(12) United States Patent
Jordi et al.

(10) Patent No.: US 7,396,883 B1
(45) Date of Patent: Jul. 8, 2008

(54) COATED POLYDIVINYLBENZENE BEADS

(75) Inventors: Howard C. Jordi, Bellingham, MA (US); Qiding Mi, Bellingham, MA (US)

(73) Assignee: Jordi FLP, Bellingham, MA (US)

( * ) Notice: Subject to any disclaimer, the term of this patent is extended or adjusted under 35 U.S.C. 154(b) by 788 days.

(21) Appl. No.: 10/794,791

(22) Filed: Mar. 5, 2004

Related U.S. Application Data

(60) Provisional application No. 60/452,221, filed on Mar. 5, 2003.

(51) Int. Cl.
*C08F 8/18* (2006.01)
(52) U.S. Cl. .............. 525/332.2; 525/359.1; 525/359.3
(58) Field of Classification Search .............. 525/332.2, 525/359.1, 359.3
See application file for complete search history.

(56) References Cited

OTHER PUBLICATIONS

Jordi, Howard, "Jordi Gel Columns for Size Exclusion Chromatography," In *Column Handbook for Size Exclusion Chromatography*, Chi-San Wu, ed. (San Diego, CA: Academic Press), pp. 367-386, (1999).
Neue, Uwe Dieter, "Waters Columns for Size Exclusion Chromatography,", In *Column Handbook for Size Exclusion Chromatography*, Chi-San Wu, ed. (San Diego, CA: Academic Press), pp. 325-341, (1999).
Chem Abstracts (CAS) Search Results, 7 pages, including Cover sheet/Email from CAS Search Agent Todd Hoitink, explaining that he retrieved no relevant answers for either his structure search or his text search. (The referenced CAS Search was done after B.Hurwitz's search was found to have been done incorrectly.), Feb. 14, 2003.

*Primary Examiner*—Bernard Lipman
(74) *Attorney, Agent, or Firm*—Arendt & Associates Intellectual Property Group; Jacqueline Arendt

(57) ABSTRACT

The present invention provides novel, polymeric supports, methods of making, and methods of using the supports, that have a fluorinated, amidated surface. The supports include polymeric microbeads, thin layers or membranes, plates, monoliths and the like. The supports are useful as packing materials for normal phase, reverse phase, and size exclusion chromatography, and provide high speed separation of analytes with excellent resolution. The fluorinated, amidated surface may include a composition comprising a plurality of repeating units, for example, having the following structure:

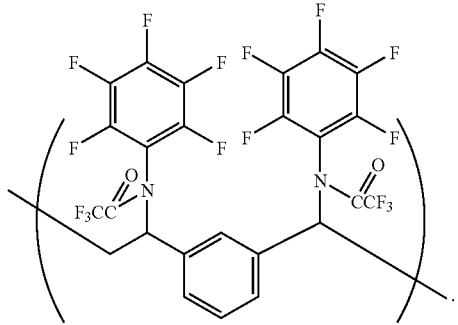

11 Claims, 18 Drawing Sheets

DESCRIPTION  Serial Number: 07110304
Packing Material: Jordi Gel DVB Mixed Bed
Length: 500 mm    ID: 10 mm Catalog Number: 15005

Fitting Code: B

TEST CONDITIONS
Mobile Phase: Chloroform
Flow Rate: 1.5 mL/min
Detector: UV 254 nm Temperature: Ambient
Pressure: 850 PSIG
Sensitivity: 0.2 AUFS

| Sample: P-sty1 | Inj. vol.: 15 µL |
|---|---|
| Component | Conc (mg/ml) |
| 1. 7520k | 1.0 |
| 2. 1000k | 1.0 |
| 3. 336k | 1.0 |
| 4. 130k | 1.0 |
| 5. 34.3k | 1.0 |
| 6. 12.1k | 1.0 |
| 7. 2.38k | 1.0 |
| 8. 0.374k | 1.0 |
| 9. 0.092k | 2.0 |

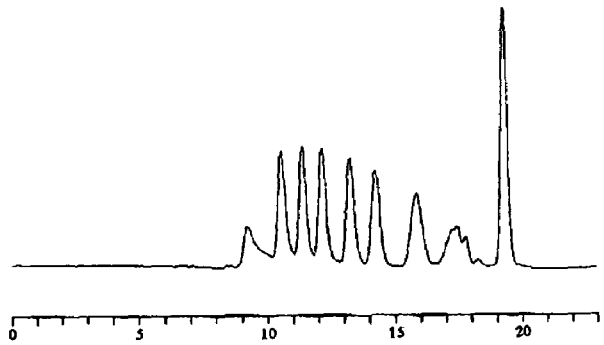

| Peak | Retention Time (min) | Capacity Factor | Symmetry | Efficiency (Plates/m) |
|---|---|---|---|---|
| 1 | 9.21 | 0.00 | 0.3 | 12501 |
| 2 | 10.56 | 0.15 | 1.0 | 13136 |
| 3 | 11.39 | 0.24 | 1.1 | 20478 |
| 4 | 12.14 | 0.32 | 1.1 | 19650 |
| 5 | 13.24 | 0.44 | 0.8 | 16808 |
| 6 | 14.24 | 0.55 | 1.0 | 19348 |
| 7 | 15.86 | 0.72 | 0.6 | 11373 |
| 8 | 17.48 | 0.90 | 0.1 | 10146 |
| 9 | 19.28 | 1.09 | 1.1 | 51586 |

Void Time: 9.21 min.

FIG. 5
(PRIOR ART)

DESCRIPTION  Serial Number: 01020309
Packing Material: Jordi Flash Gel Mixed Bed
Length: 500 mm    ID: 10 mm Catalog Number: TEFMB Fitting Code: B

TEST CONDITIONS
Mobile Phase: Chloroform
Flow Rate: 1.5 mL/min
Detector: UV 254 nm Temperature: Ambient
Pressure: 600 PSIG
Sensitivity: 0.2 AUFS Sample: P-sty1    Inj. vol.: 15 μL

| Component | Conc (mg/ml) |
|---|---|
| 1. 7520K | 1.0 |
| 2. 1000K | 1.0 |
| 3. 336K | 1.0 |
| 4. 130K | 1.0 |
| 5. 34.3K | 1.0 |
| 6. 12.1K | 1.0 |
| 7. 2.38K | 1.0 |
| 8. 0.374K | 1.0 |
| 9. 0.092K | 2.0 |

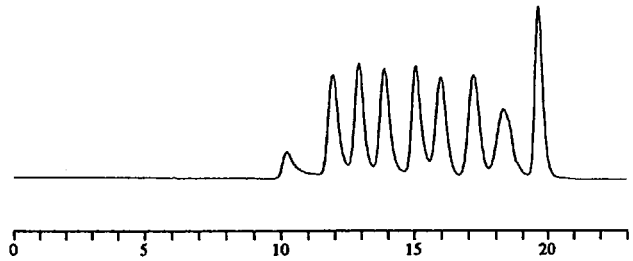

| Peak | Retention Time (min) | Capacity Factor | Symmetry | Efficiency (Plates/m) |
|---|---|---|---|---|
| 1 | 19.65 | 0.00 | 1.1 | 44503 |

Void Time: 19.65 min.

FIG. 7

DESCRIPTION Serial Number: 09260301
Packing Material: Jordi Flash Gel Mixed Bed
Length: 500 mm   ID: 10 mm Catalog Number: TEFMB500

Fitting Code: B

TEST CONDITIONS
Mobile Phase: Chloroform
Flow Rate: 3.0 mL/min
Detector: UV 254 nm Temperature: Ambient
Pressure: 1200 PSIG
Sensitivity: 0.2 AUFS Sample: P-sty1    Inj. vol.: 15 µL

| Component | Conc (mg/ml) |
|---|---|
| 1. 7520k | 1.0 |
| 2. 1000k | 1.0 |
| 3. 336k | 1.0 |
| 4. 130k | 1.0 |
| 5. 34.3k | 1.0 |
| 6. 12.1k | 1.0 |
| 7. 2.38k | 1.0 |
| 8. 0.374k | 1.0 |
| 9. 0.092k | 2.0 |

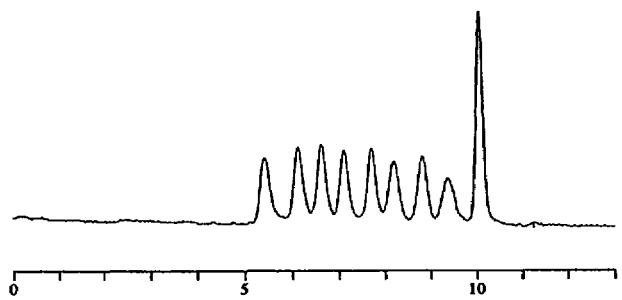

| Peak | Retention Time (min) | Capacity Factor | Symmetry | Efficiency (Plates/m) |
|---|---|---|---|---|
| 1 | 10.06 | 0.00 | 1.2 | 45196 |

Void Time: 10.06 min.

FIG. 8

DESCRIPTION Serial Number: 01026308

Packing Material: Jordi Gel 500A
Length: 500 mm    ID: 10 mm

Catalog Number: 15001

Fitting Code: B

TEST CONDITIONS

Mobile Phase: Chloroform
Flow Rate: 4.0 mL/min
Detector: UV 254 nm

Temperature: Ambient
Pressure: 4500 PSIG
Sensitivity: 0.2 AUFS

Sample: P-Sty 1          Inj. vol.: 7 μL

| Component | Conc (mg/ml) |
|---|---|
| 1. 2180K | 1.0 |
| 2. 34.3K | 1.0 |
| 3. 12.1K | 1.0 |
| 4. 2.3K | 1.0 |
| 5. 0.374K | 1.0 |
| 6. 0.092K | 2.0 |

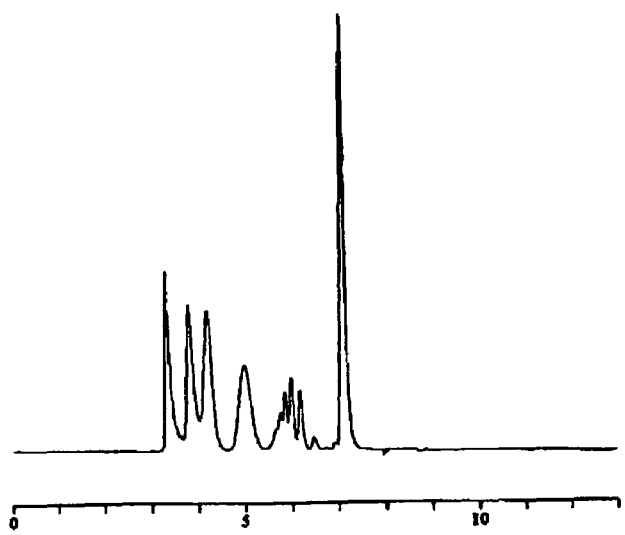

| Peak | Retention Time (min) | Capacity Factor | Symmetry | Efficiency (Plates/m) |
|---|---|---|---|---|
| 1 | 4.21 | 0.00 | 2.2 | 9337 |
| 2 | 5.01 | 0.19 | 1.1 | 3567 |
| 3 | 7.09 | 0.69 | 1.6 | 53051 |

Void Time: 4.21 min.

FIG. 10
(PRIOR ART)

DESCRIPTION Serial Number: 12190302
Packing Material: Jordi Flash Gel 500A
Length: 500 mm   ID: 10 mm Catalog Number: TEF500

Fitting Code: B

TEST CONDITIONS
Mobile Phase: Chloroform
Flow Rate: 1.5 mL/min
Detector: UV 254 nm Temperature: Ambient
Pressure: 600 PSIG
Sensitivity: 0.2 AUFS Sample: P-Sty 1                Inj. vol.: 7 $\mu$L

| Component | Conc (mg/ml) |
|---|---|
| 1. 2180K | 1.0 |
| 2. 34.3K | 1.0 |
| 3. 12.1K | 1.0 |
| 4. 2.38K | 1.0 |
| 5. 0.374K | 1.0 |
| 6. 0.092K | 2.0 |

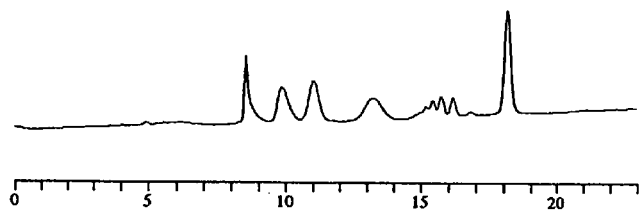

| Peak | Retention Time (min) | Capacity Factor | Symmetry | Efficiency (Plates/m) |
|---|---|---|---|---|
| 1 | 18.15 | 0.00 | 1.0 | 64234 |

Void Time: 18.15 min.

FIG. 11

DESCRIPTION Serial Number: 12190304
Packing Material: Jordi Flash Gel 500A
Length: 500 mm   ID: 10 mm Catalog Number: TEF500

Fitting Code: B

TEST CONDITIONS
Mobile Phase: Chloroform
Flow Rate: 4.0 mL/min
Detector: UV 254 nm Temperature: Ambient
Pressure: 2000 PSIG
Sensitivity: 0.2 AUFS Sample: P-Sty 1        Inj. vol.: 7 μL

| Component | Conc (mg/ml) |
|---|---|
| 1. 2180K | 1.0 |
| 2. 34.3K | 1.0 |
| 3. 12.1K | 1.0 |
| 4. 2.38K | 1.0 |
| 5. 0.374K | 1.0 |
| 6. 0.092K | 2.0 |

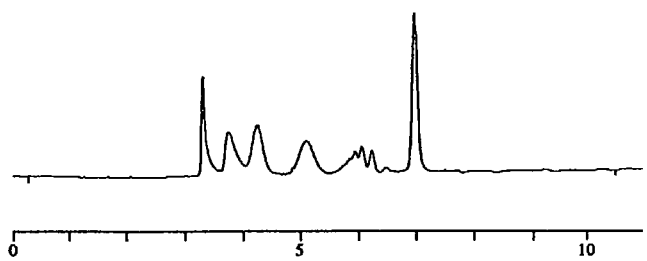

| Peak | Retention Time (min) | Capacity Factor | Symmetry | Efficiency (Plates/m) |
|---|---|---|---|---|
| 1 | 7.01 | 0.00 | 1.0 | 57262 |

Void Time: 7.01 min.

FIG. 12

DESCRIPTION   Serial Number: 05290301
Packing Material: Jordi Flash Gel Mixed Bed
Length: 250 mm   ID: 4.6 mm

TEST CONDITIONS
Mobile Phase: Chloroform
Flow Rate: 0.5 mL/min
Detector: UV 254 nm Catalog Number: TEFMBR Temperature: 40C
Pressure: 400 PSIG
Sensitivity: 0.2 AUFS Sample: P-sty1          Inj. vol.: 3 μL

| Component | Conc (mg/ml) |
|---|---|
| 1. 2180k | 1.0 |
| 2. 336k | 1.0 |
| 3. 12.1k | 1.0 |
| 4. 0.092k | 2.0 |

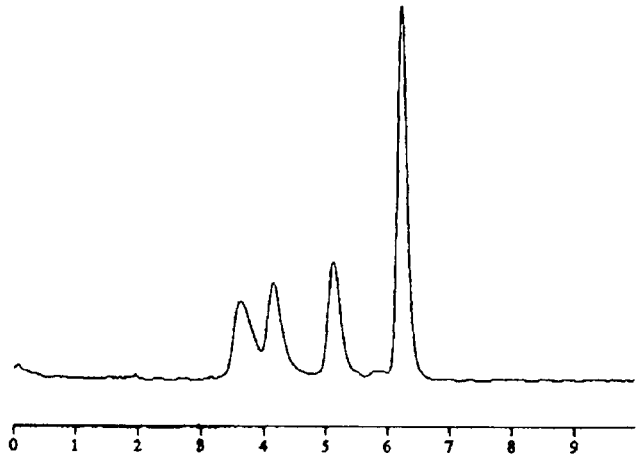

| Peak | Retention Time (min) | Capacity Factor | Symmetry | Efficiency (Plates/m) |
|---|---|---|---|---|
| 1 | 6.23 | 0.00 | 1.4 | 33295 |

Void Time: 6.23 min.

FIG. 13

DESCRIPTION Serial Number: 05280304  
Packing Material: Jordi Flash Gel Mixed Bed  
Length: 250 mm   ID: 4.6 mm Catalog Number: TEFMBR

TEST CONDITIONS
Mobile Phase: Chloroform  
Flow Rate: 1.0 mL/min  
Detector: UV 254 nm Temperature: 40c  
Pressure: 700 PSIG  
Sensitivity: 0.2 AUFS Sample: P-sty1   Inj. vol.: 2 μL

| Component | Conc (mg/ml) |
|---|---|
| 1. 2180K | 1.0 |
| 2. 336K | 1.0 |
| 3. 12.1K | 1.0 |
| 4. 0.092K | 2.0 |

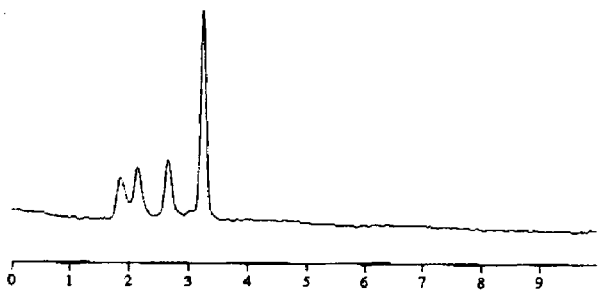

| Peak | Retention Time (min) | Capacity Factor | Symmetry | Efficiency (Plates/m) |
|---|---|---|---|---|
| 1 | 3.26 | 0.00 | 1.1 | 24761 |

Void Time: 3.26 min.

FIG. 14

DESCRIPTION Serial Number: 05290308
Packing Material: Jordi Flash Gel Mixed Bed
Length: 250 mm   ID: 4.6 mm Catalog Number: TEFMBR

TEST CONDITIONS
Mobile Phase: Chloroform
Flow Rate: 1.5 mL/min
Detector: UV 254 nm Temperature: 40C
Pressure: 1000 PSIG
Sensitivity: 0.2 AUFS Sample: P-sty 1    Inj. vol.: 3 µL

| Component | Conc (mg/ml) |
|---|---|
| 1. 2180k | 1.0 |
| 2. 336k | 1.0 |
| 3. 12.1k | 1.0 |
| 4. 0.092k | 2.0 |

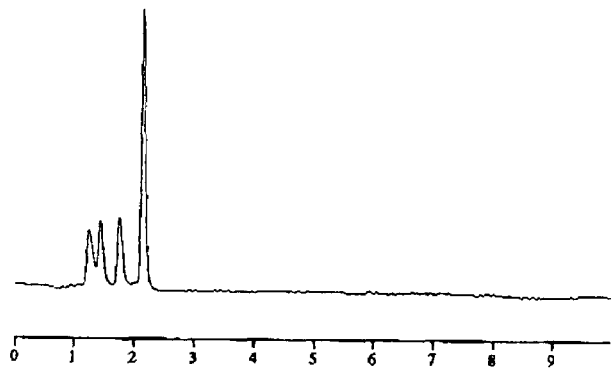

| Peak | Retention Time (min) | Capacity Factor | Symmetry | Efficiency (Plates/m) |
|---|---|---|---|---|
| 1 | 2.15 | 0.00 | 1.4 | 28520 |

Void Time: 2.15 min.

FIG. 15

DESCRIPTION  Serial Number: 05290309
Packing Material: Jordi Flash Gel Mixed Bed
Length: 250 mm    ID: 4.6 mm Catalog Number: TEFMBR

TEST CONDITIONS
Mobile Phase: Chloroform
Flow Rate: 2.0 mL/min
Detector: UV 254 nm Temperature: 40C
Pressure: 1800 PSIG
Sensitivity: 0.2 AUFS Sample: P-sty1         Inj. vol.: 3 μL

| Component | Conc (mg/ml) |
|---|---|
| 1. 2180k | 1.0 |
| 2. 336k | 1.0 |
| 3. 12.1k | 1.0 |
| 4. 0.092k | 2.0 |

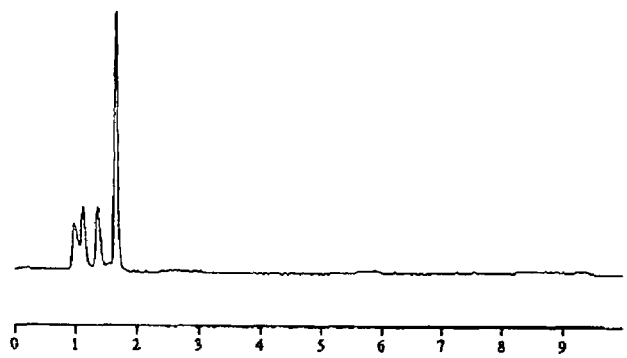

| Peak | Retention Time (min) | Capacity Factor | Symmetry | Efficiency (Plates/m) |
|---|---|---|---|---|
| 1 | 1.65 | 0.00 | 1.4 | 24982 |

Void Time: 1.65 min.

FIG. 16

| Column Solvent: Chloroform | FIG. | Flow Rate mL/min. | Back Pressure (psi) | Assay Time | Polymer Shearing |
|---|---|---|---|---|---|
| Mixed Bed Column 500 x 10mm (Prior Art Column) | 5 | 1.5 | 850 | 19 min. | Yes |
| Mixed Bed Column 500 x 10mm (Prior Art Column) | 6 | 3.0 | 1650 | 10 min. | Severe |
| Mixed Bed Column 500 x 10mm | 7 | 1.5 | 600 | 20 min. | No |
| Mixed Bed Column 500 x 10mm | 8 | 3.0 | 1200 | 10 min. | No |
| Mixed Bed Column 500 x 10mm – small pore (Prior Art Column) | 9 | 1.5 | 1500 | 19 min. | NA |
| Mixed Bed Column 500 x 10mm – small pore (Prior Art Column) | 10 | 4.0 | 4500 | 7 min. | NA |
| Mixed Bed Column 500 x 10mm – small pore | 11 | 1.5 | 600 | 18 min. | NA |
| Mixed Bed Column 500 x 10mm – small pore | 12 | 4.0 | 2000 | 7 min. | NA |
| Mixed Bed Column 250 x 4.6mm | 13 | 0.5 | 400 | 6 min. | No |
| Mixed Bed Column 250 x 4.6mm | 14 | 1.0 | 700 | 3 min. | No |
| Mixed Bed Column 250 x 4.6mm | 15 | 1.5 | 1000 | 2 min. | No |
| Mixed Bed Column 250 x 4.6mm | 16 | 2.0 | 1800 | 1.6 min. | Slight |

FIG. 18

COATED POLYDIVINYLBENZENE BEADS

RELATED APPLICATION

This application claims the benefit of U.S. Provisional Application No. 60/452,221 filed on Mar. 5, 2003, the teachings of which are incorporated herein by reference in their entirety.

BACKGROUND OF THE INVENTION

The preparation of chemically bonded high performance liquid chromatography (HPLC) stationary phases, generally made of either an inorganic or organic microspherical support, was first developed in the 1960s.[1] In order to provide increased separation efficiencies and higher surface area per gram, the support is generally formed by means of an oil/water or a water/oil suspension polymerization of liquid microdroplets of monomers into spherical, porous, solid, micron-sized polymer beads or microbeads. The microbeads are either polymers or copolymers, for example, of styrene and divinylbenzene, and are in the form of a gel. The microbeads may have varying degrees of porosity, and may then be further derivatized to provide a specific surface chemistry. The HPLC gel serves as a tool for the separation of a wide variety of analytes. Packing the gels into steel and heavy walled plastic tubes, referred to as "columns", allows the application of high pressures which are used to force the analyte and a solvent through the column at an increased rate.

"Gel permeation chromatography" (GPC), also known as "size exclusion chromatography (SEC)", or gel-filtration chromatography (GFC), is a method of separation in which molecules are separated based on their size, molecular weight, or molecular weight distribution.

"Reverse phase" (RP) or affinity chromatography is a complementary method of separation based on molecular interactions. In RP, separation is accomplished by the differing affinity of the analyte for the column packing material and for the mobile phase or solvent which passes through the column. This method of separation comprises a whole series of techniques including reverse, normal, affinity, and ion exchange chromatography.

Thus, in contrast to RP, it is intended in SEC and GPC that the analyte should not have any enthalpic interactions with the stationary phase. Although GPC and SEC are often used interchangeably by those skilled in the art, GPC is the term generally applied to aqueous separations, while SEC is a broader term encompassing both organic and aqueous mobile phases. SEC comprises a separation of a group of analytes that "results from the distribution of the sample between the moving mobile phase and the stagnant portion of the mobile phase retained within the porous structure of the stationary phase."[1] Analytes of differing size can diffuse through the pore structure of the stationary phase to a different extent. Smaller molecules can more readily penetrate the pores of the packing material and thus they remain in the column longer, while larger molecules pass through the column in a more direct manner and elute earlier.

SEC was originally performed on crosslinked poly(dextran) and poly(saccharide) gels for biopolymers and water soluble synthetic polymers. Porous crosslinked poly(styrene) gels were introduced at the same time for the separation of organic soluble polymers. Modern SEC is accomplished using small, for example, micrometer-sized (elm-sized), rigid, porous particles usually formed on a polymeric or silica-based support.[1,20] Determination of the molecular weight of a polymer sample is often accomplished by correlating the elution time with standards of known molecular weight and constructing a calibration curve.

The chemical structure of the polymeric supports used to accomplish SEC has historically been dominated by polystyrene divinylbenzene copolymers. This does not mean that these supports are not often applied to other chromatography applications including reverse phase and affinity chromatography (RP). Frechet and coworkers studied the effect of the percent divinyl benzene in the copolymer and found that the efficiencies of the packing material increase with the divinylbenzene content. They also reported that increasing the content of divinylbenzene results in an increase in the formation of micropores.[3] A vast amount of similar work has been reported either in the creation or use of polystyrene divinylbenzene copolymers.[4–17] To the authors' knowledge only one example of a reported synthesis of a pure divinylbenzene gel has been reported.[13] Other polymers, especially methacrylates, have also been applied in the creation of column separatory media.[18,20]

The surface modification of polystyrene divinylbenzene-based materials has also received considerable attention. The primary focus of this work has been in the creation of ion exchange resins for both cation and anion exchange.[15,19] Leonard in a 1997 review stated that "only a few organic polymer-based packings modified with covalently bound polymer layers have been introduced recently."[20] He also stated that the main reason for this was the lack of a convenient handle from which to bond surface chemistries to poly(styrene) type gels. The main methods by which bonding chemistries have been introduced include chemical modification of the surface chemistry, co-polymerizations with functional monomers, radiochemical modification by graft polymerization, and radio-derivatization.[22] Lloyd reported, without providing details of the synthetic method, the covalent bonding of a hydrophilic layer onto poly(styrene) beads, resulting in poly(hydroxyl) functionality. The alcohol functionality of this stationary phase was then used as a handle for the creation of affinity chromatography packings.[15] Carbodiimide has been used as a catalyst for the reaction of different dinitrophenyl amino acids with poly(styrene-divinylbenzene) gels which were also applied as affinity packings.[22] Dextran coatings have also been bonded to polystyrene gels.[23] Another approach to forming functionalized supports has been the creation of new copolymers. Lewandowski and coworkers used a mixture of vinylphenol and divinylbenzene for this purpose.[21] Commercial suppliers of SEC poly(styrene) divinylbenzene columns include American Polymer Standards, Shodex, Waters, Polymer Laboratories, and Jordi FLP.

Currently available column technology for SEC of polymers has reached a high level of separation efficiency. It is now possible to separate molecules that differ by as little as a single carbon atom for lower molecular weight materials. However, the long run times necessary for analysis remains a common problem with the use of current column technology. In order to reduce run times, attempts have been made to increase the flow rate. Lloyd reported the use of poly(Styrene) based columns for rapid separations in which he analyzed the column efficiency as a function of the flow rate. He found that an inverse relationship exists. Thus, the higher the flow rate used, the less efficient the separation became.[15]

Another problem associated with using increased flow rates is a resulting high back pressure. One attempt to overcome this problem utilized columns of reduced dimensions and a new stationary phase. Whereas a typical SEC column is 30 cm×7.8 mm, the use of columns of 50 mm×20 mm (reduced length and increased width) was reported to result in lower back pressures, allowing for faster flow rates and shorter run times.[24] Column resolution was still reported to decrease at higher flow rates, but the decrease in resolution appears to occur at a slower rate than that for prior art phases. An obvious drawback of the use of shorter columns is that the smaller amount of gel contained within a column of reduced dimensions also limits sample loadability.

SUMMARY OF THE INVENTION

The present invention provides novel polymeric supports, methods of making, and methods of using the supports, that have a fluorinated, amidated surface. Supports suitable for use in an embodiment of the invention include polymeric microbeads, thin layers or membranes, plates, monoliths and the like. The supports are useful as packing materials for normal phase, reverse phase, and size exclusion chromatography, and provide high speed separation of analytes with excellent resolution. In one embodiment of the invention, the novel compositions are included in a surface modification of polymeric microbeads in a gel or slurry used to pack HPLC columns. Examples of polymers used to make the supports include polydivinylbenzene and polystyrene divinylbenzene copolymer. It should be noted that, typically, commercially available "divinylbenzene" starting materials that are used to make an embodiment of the invention are actually complex mixtures of meta and paradivinylbenzene; meta and paraethylvinylbenzene; and small amounts of meta and paradiethylbenzene, the diethylbenzene being an inert material that is washed out. The gel forms the stationary phase in HPLC separations.

In general, in prior art gels, resolution is significantly affected by flow rate. Thus, in prior attempts to achieve high speed separation in HPLC columns, it has often been found that the maximum eluent velocity practical in GPC/SEC is limited by the loss in resolution at higher velocities. The present invention overcomes these problems. In one embodiment of the invention, the novel polymeric microbeads are used to achieve high throughput polymer analysis, while maintaining high resolution.

The invention inter alia comprises the following, alone or in combination. In one embodiment of the invention, the compositions provided include a plurality of repeating units independently chosen from structures of Formula I,

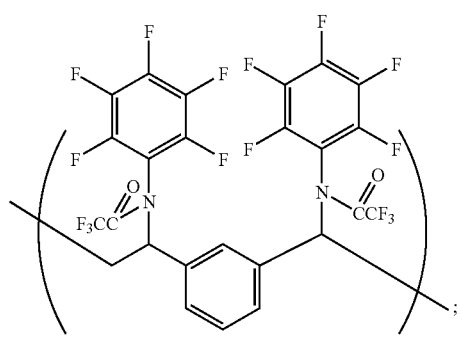

Formula II,

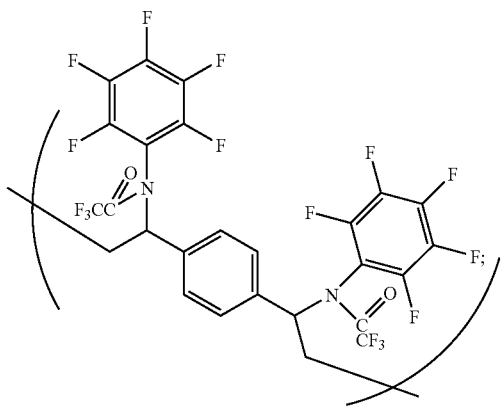

Formula III,

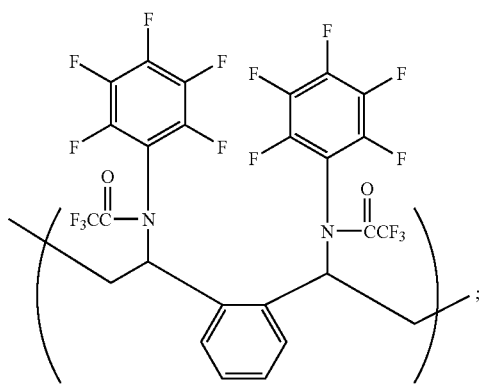

Formula IV,

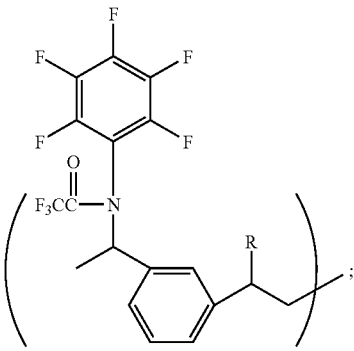

Formula V,

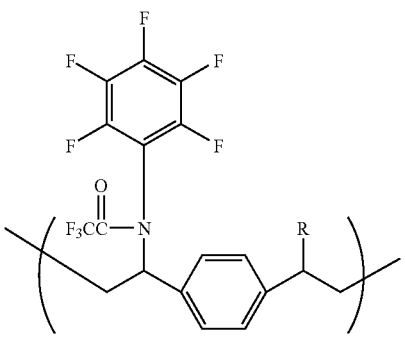

V; and

Formula VI,

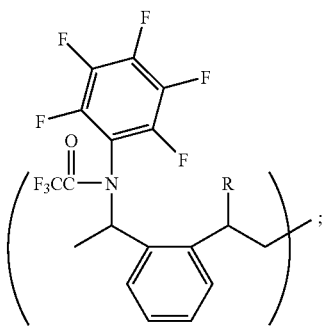

wherein R is chosen from H, Cl, Br, F, and tosyl.

In one embodiment, the repeating units are the same; in another embodiment the repeating units are different. According to an embodiment of the invention, the repeating units are at a support, the support being a backbone structure which is essentially a polymer or a copolymer selected from polydivinylbenzene, polystyrene, polystyrene-polydivinylbenzene, polytrivinylbenzene, and mixtures thereof. The polymeric support may be in the form of microbeads, that may have varying degrees of porosity. The surface of the microbeads according to an embodiment of the invention is modified to provide a surface chemistry that minimizes undesirable interactions between polymers being analyzed and the microbeads.

As described below in greater detail, according to an embodiment of the invention, the polymeric support is porous, and a portion of the repeating units covers a surface of the support, and another portion of the repeating units is within the pores of the support. Thus, although the chemical modification of the polymer backbone provided by the repeating units according to the invention is a surface modification, the repeating units form a coating over the surface of the microbeads, the surface of the microbeads including the surface of the pores in the microbeads.

Another embodiment of the invention is a composition formed by a process including the steps of:

a) reacting a polymer with a substance X to form a leaving group, thereby forming a product of step a);

b) reacting the product of step a) with a fluorinated amine, thereby forming at least one product of step b); and c) reacting the product of step b) with a halogenated compound chosen from a halogenated anhydride, a halogenated acetyl chloride, a halogenated benzoyl chloride, a halogenated arylamine, and a halogenated diamine, thereby forming the product of step c).

An exemplary embodiment of the invention is a composition formed by a process including:

a) reacting a starting polymer with bromine, thereby forming a brominated polymer;

b) reacting the brominated polymer with a fluorinated amine, thereby forming a polymer having at least one secondary amine group, and at least one fluorinated phenyl; and c) reacting the polymer having at least one secondary amine group and at least one fluorinated phenyl with a compound chosen from a fluorinated anhydride, a fluorinated acetyl chloride, a fluorinated benzoyl chloride, a fluorinated arylamine, and a fluorinated diamine, thereby converting the secondary amine group on the polymer to an amide group.

Another exemplary embodiment of the invention is a composition formed by a process including:

a) reacting a polymer with bromine, thereby forming a brominated polymer;

b) reacting the brominated polymer with 2,3,4,5,6-pentafluoroanaline,

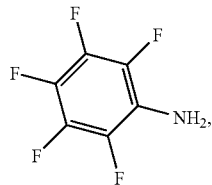

thereby forming a polymer having at least one secondary amine group, and at least one fluorinated phenyl; and c) reacting the polymer having at least one secondary amine group and at least one fluorinated phenyl with trifluoroacetic anhydride,

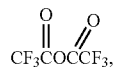

thereby converting the secondary amine group on the polymer to an amide group,

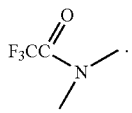

Yet another embodiment of the invention is a process for modifying a surface of a plurality of polymeric microbeads used in liquid chromatography, the process including the steps of:

a) reacting the polymeric microbeads with a substance X to form a leaving group, thereby forming at least one product of step a);

b) reacting the product of step a) with a fluorinated amine, thereby forming at least one product of step b); and c) reacting the product of step b) with a halogenated compound chosen from a halogenated anhydride, a halogenated acetyl chloride, a halogenated benzoyl chloride, a halogenated arylamine, and a halogenated diamine; thereby modifying the surface of the polymeric microbeads.

In another aspect, the invention relates to a method for separating and analyzing a mixture of analytes in a polymer sample, the method including:

a) packing a liquid chromatography column with a gel sample comprising at least one composition of Claim 1;

b) introducing the analyte sample and a solvent to the liquid chromatography column;

c) applying pressure through a suitable pumping system;

d) allowing the solvent to diffuse through the column;

e) monitoring the eluent with a detector; thereby separating the analytes of the polymer sample by a molecular weight distribution or by affinity for the stationary phase.

A number of suitable pumping systems are conventionally used for liquid chromatography, and the choosing of a pumping system suitable for use in an embodiment of a method of the invention would be within the skill of those working in the HPLC art. The detector used in an embodiment is chosen from a refractive index detector, an evaporative light scattering detector, and an ultraviolet light detector.

The present invention provides improved column technology with a means for rapid, but efficient separations, that is, separations characterized by both a high flow rate and a high level of resolution. A column utilizing a composition according to an embodiment of the invention avoids high back pressure generally associated with increased flow rates.

Other features and advantages will be apparent from the following description of the preferred embodiments thereof, from the drawing, and from the claims.

BRIEF DESCRIPTION OF THE DRAWING

FIG. 5 is a prior art chromatogram showing SEC separation of nine standard polystyrenes at a flow rate of 1.5 mL/min. in a 500 mm column and a pressure of 850 psi.

FIG. 7 is a chromatogram showing SEC separation of the same nine standard polystyrenes, using a gel composition of the invention at a flow rate of 1.5 ml/min in a 500 mm column and a pressure of 600 psi.

FIG. 8 is a chromatogram showing SEC separation of the same nine standard polystyrenes, using a gel composition of the invention at a flow rate of 3.0 ml/min. in a 500 mm column and a pressure of 1200 psi.

FIG. 10 is a prior art chromatogram showing SEC separation of six standard polystyrenes, using a small pore prior art gel composition at a flow rate of 4.0 mL/min.in a 500 mm column and a pressure of 4500 psi.

FIG. 11 is a chromatogram showing SEC separation of six standard polystyrenes, using a small pore gel composition of the invention at a flow rate of 1.5 ml/min. in a 500 mm column and a pressure of 600 psi.

FIG. 12 is a chromatogram showing SEC separation of six standard polystyrenes, using a small pore gel composition of the invention at a flow rate of 4.0 ml/min. in a 500 mm column and a pressure of 2000 psi.

FIG. 13 is a chromatogram showing SEC separation of four standard polystyrenes, using a gel composition of the invention at a flow rate of 0.5 ml/min. in a 250 mm column and a pressure of 400 psi.

FIG. 14 is a chromatogram showing SEC separation of four standard polystyrenes, using a gel composition of the invention at a flow rate of 1.0 ml/min. in a 250 mm column and a pressure of 700 psi.

FIG. 15 is a chromatogram showing SEC separation of four standard polystyrenes, using a gel composition of the invention at a flow rate of 1.5 ml/min. in a 250 mm column and a pressure of 1000 psi.

FIG. 16 is a chromatogram showing SEC separation of four standard polystyrenes, using a gel composition of the invention at a flow rate of 2.0 ml/min. in a 250 mm column and a pressure of 1800 psi.

FIG. 18 is a chart providing a comparison of flow rate, back pressure, assay time, and polymer shearing for four prior art columns (FIGS. 5-6, 9-10) and eight columns (FIGS. 7-8, 11-16) using the disclosed compositions.

DETAILED DESCRIPTION OF THE INVENTION

The invention provides a fluorinated stationary phase of polymers that is useful, for example, in normal phase, reverse phase, and size exclusion chromatography to separate analytes by molecular mass, or by affinity for the stationary phase. An example of the disclosed fluorinated stationary phase is fluorinated divinylbenzene (F-DVB), that differs from conventional materials both in the chemical nature of the bonded phase and most notably in the effect of flow rate on column efficiency. Typically, with use of many prior art columns, increasing the flow or migration rate through the stationary phase will adversely affect the resolution and separation.

No examples of fluorinated polystyrene or divinylbenzene based SEC materials could be found in the literature. This may be a result of the lack of a clear synthetic route to producing these materials. One approach to producing fluorinated gels includes the use of fluorine gas. We tried to use fluorine and failed, as described in the section below outlining our initial attempts.

Furthermore, even the new fluorinated phase according to an embodiment of our present invention did not exhibit superior properties until the secondary amine functionality was converted to an amide.

It is not obvious that an amide functionality, considering its polarity, would be sufficiently less interactive to prevent efficiency loss. The new F-DVB phase of a composition according to an embodiment of the present invention has greatly reduced interactions between the stationary phase and mobile phase that would not have been predicted. The fluorinated surface chemistry displays properties similar to that of Teflon®, even with the presence of aromatic rings and amide groups. An advantage of our polymeric microbeads with a novel fluorinated, amidated surface, is a large decrease in column back pressure, that allows for the application of high flow rates. The new fluorinated support reduces the likelihood of shear stress on the analyte. Diffusion through the porous structure of the beads is greatly facilitated, resulting in only very small changes in resolution with flow rate. To our knowledge this is the only packing material which can be operated at high flow rates without sacrificing significant column performance.

Initial Attempts to Create Improved Stationary Phases

Figure 1A:
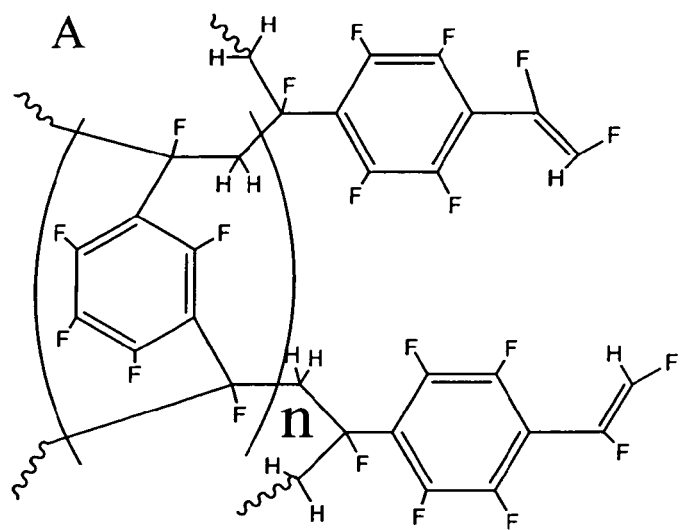
FIG. 1A is a schematic representation of the desired product in an original attempt to create a fluorinated surface on a microbead comprising polydivinylbenzene.
Figure 1B:
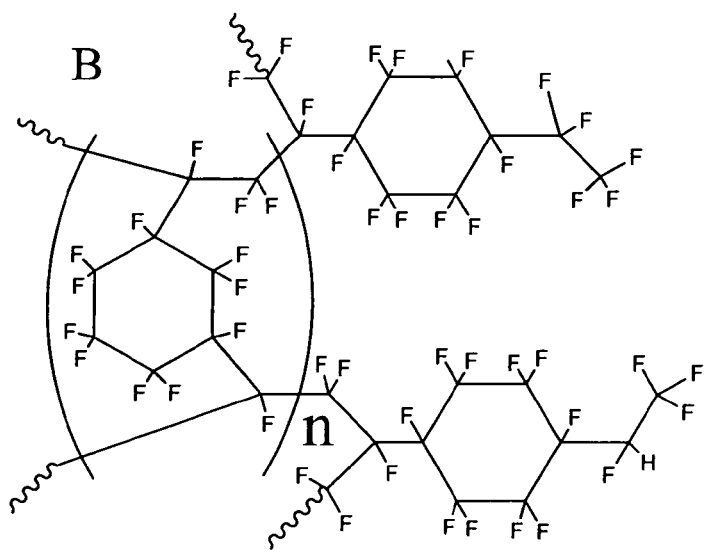
FIG. 1B is a schematic representation of the actually-obtained product in the original attempt to create a fluorinated surface.

Over a time period of several years, we made many attempts to produce a fluorinated stationary phase. Original attempts include the reaction of the divinylbenzene stationary phase with fluorine gas ($F_2$ gas). Using special fluorination equipment, necessitated by the high toxicity and reactivity of fluorine gas, the reaction between polymerized metadivinylbenzene and fluorine gas was conducted in conjunction with professor James Stark of Eastern Nazarene University. The desired reaction product was the gel shown in FIG. 1A. Unfortunately the resulting material was actually that shown in FIG. 1B. The loss of aromaticity that accompanied the addition of the second fluorine atom resulted in greatly reduced material strength. Due to the high pressures required in HPLC, the reduced material strength prevented its use as a stationary phase.

Bonding Chemistry Outline

1) Bromination of DVB Phases:

The starting polymer for the synthesis of a fluorinated, amidated gel phase of the invention can be almost any polymer or co-polymer, except for the new protein gels, suitable for use in an HPLC column.

The porosity of the gel chosen for the reaction has been found not to have an effect on the reaction. The examples described below are effective for the modification of the surface chemistry of any porosity gel that has been attempted, including gels of a mixture of pores or pore sizes capable of resolving materials from monomers to $10^7$ molecular weight.

Figure 2:
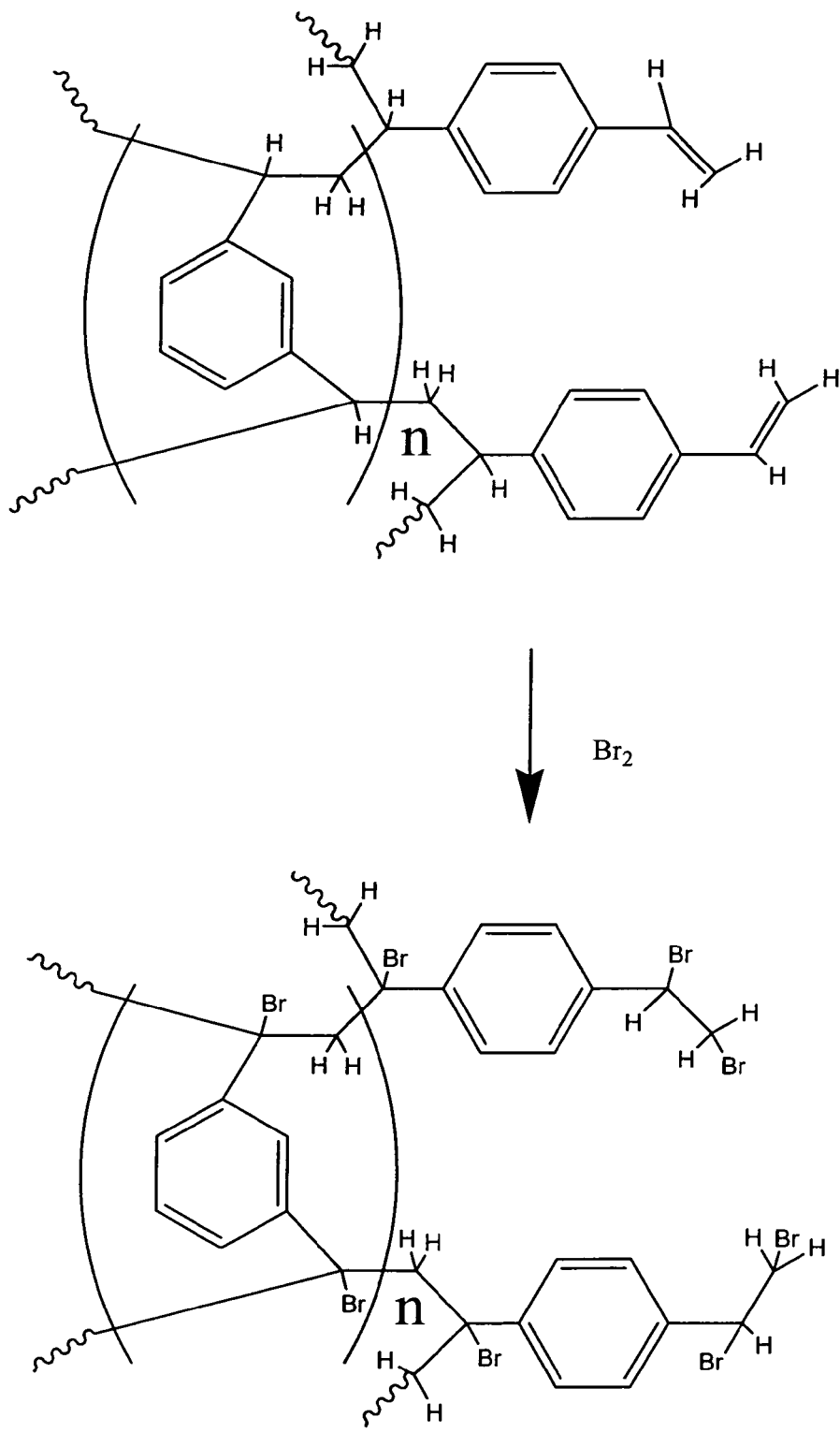
FIG. 2 is a schematic representation of bromination of divinylbenzene gel, the first step in the process of making a composition according to an embodiment of the invention.

For example, a preferred polymer is made from 100% divinylbenzene (DVB) as can be seen in FIG. 2. It is not intended by the inventors to indicate that the bonding chemistry described herein is in any way limited to only purely DVB stationary phases. For example, styrene-DVB copolymers should also be amenable to this procedure.

In addition to polydivinylbenzene (ortho, meta and para), polystyrene, polystyrene-polydivinylbenzene, other polymers such as polytrivinylbenzene, polymethylmethacrylate, polyethylene dimethacrylate, polymethacrylonitrile, polymethacrolein, polyvinylalcohol, polyacrylamide, polymers or copolymers of norbornene, and polymers of branched or straight-chain alkyl, optionally substituted with aryl or substituted aryl, and mixtures thereof, may also be suitable for use in an embodiment of the invention. Those of skill in the polymer art will know, or will be able to ascertain with no more than routine experimentation, what polymers or copolymers can be used as a starting polymer for making a fluorinated, amidated gel according to the invention.

The first step in the bonding chemistry is the creation of a chemical handle through which other molecules may be bonded to the gel. A non-limiting example according to an embodiment of the invention of how this can be accomplished is by reaction of the gel with a substance X to form a leaving group. An example of a substance X suitable for reaction with the gel to form a leaving group is a halogen, $X_2$, such as, for example, bromine. Other non-limiting examples include chlorine, and iodine. The term "leaving group", as used herein, refers to a substituent or group of atoms susceptible to nucleophilic substitution or a displacement reaction. A leaving group is more likely to undergo substitution than a non-leaving group such as H or methyl. An example of the mechanism of this reaction is demonstrated in the following table, Table 1:

TABLE 1

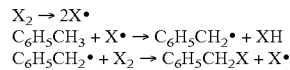

Benzylic radicals are unusually stable and therefore the major product is substitution of a hydrogen on the carbon atoms alpha to the aromatic rings. Another reaction that is also likely is the addition reaction of, for example, two bromine atoms to each terminal double bond to form the dihaloalkane. Thus the final product resulting from this reaction is that shown in FIG. 2.

Figure 3:
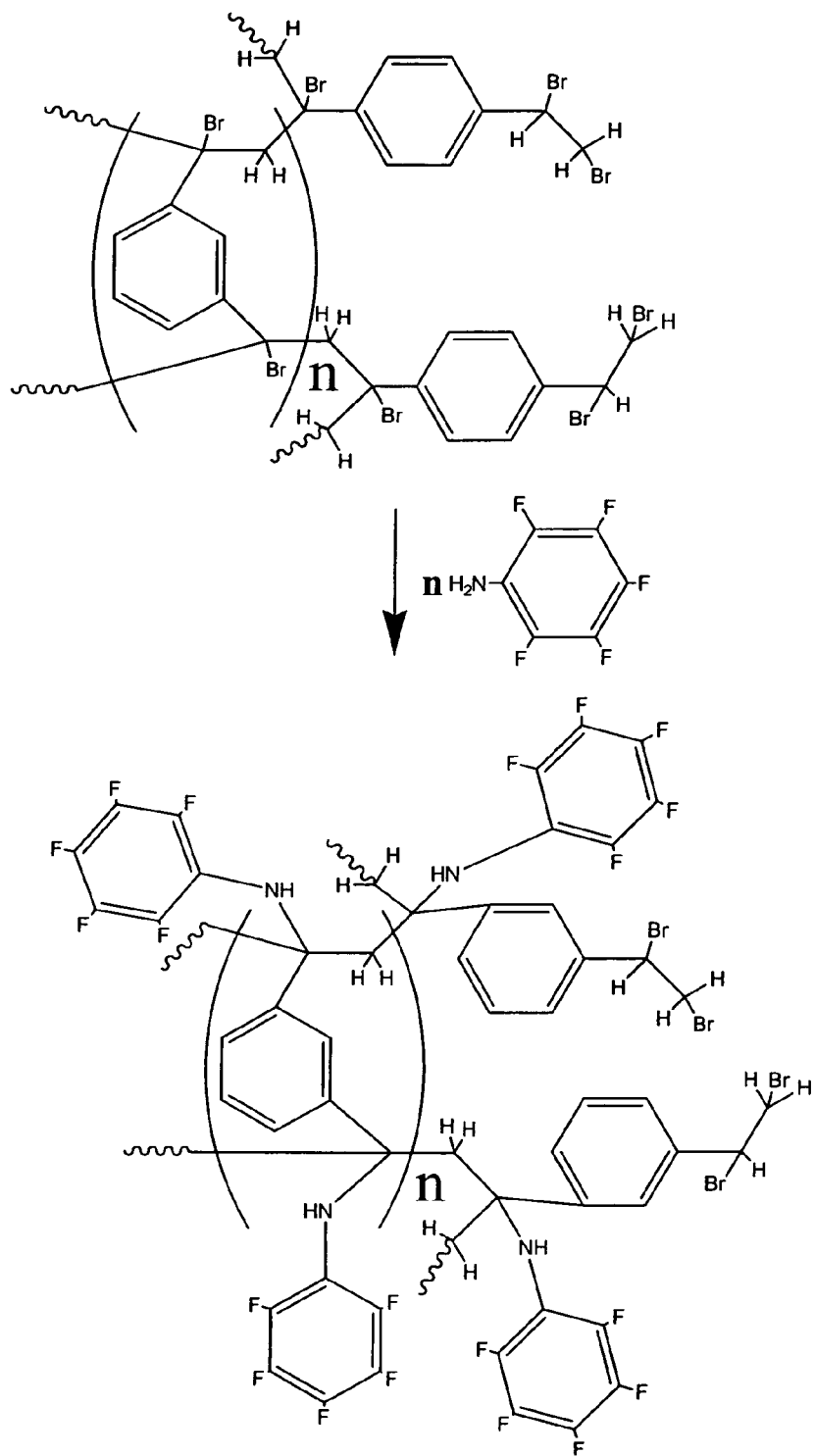
FIG. 3 is a schematic representation of amination of brominated divinylbenzene, using 2,3,4,5,6-pentafluoroanaline, the second step in the process of making a composition according to an embodiment of the invention.

2) Amination of Brominated DVB:

In a method according to an embodiment of the invention, the amination of a halogenated DVB phase, for example, a brominated DVB phase, is conducted by a nucleophilic substitution reaction in which a hydrogen halide, for example, hydrogen bromide, is removed while forming the secondary amine. This reaction is schematically represented in FIG. 3. Each carbon with an attached bromine is a potential sight at which reaction can occur. The bromine atoms that are not on carbons adjacent to a phenyl ring are known to be less reactive. It is therefore believed that the bromine atoms attached to the terminal vinyl groups are likely to remain unreacted.

According to an embodiment of the invention, a preferred reagent used to aminate the brominated DVB is 2,3,4,5,6-pentafluoroanaline, as shown in FIG. 3. This reagent is available from Aldrich Chemical. Many other reagents are suitable for use in aminating the brominated DVB, including, for example, 2,2,2-trifluoroethylamine;
2,5-difluorobenzylamine;
4-(trifluoromethoxy)benzylamine;
3-(2,3,4,5,6-pentafluoro-phenoxy)-phenylamine;
3-fluoro-5-(trifluoromethyl)benzylamine; and
1,1,1,3,3,3-hexafluoro-2,2-propane diamine.

All of these are available from Aldrich Chemical. Those of skill in the art will know, or will be able to ascertain with no more than routine experimentation, what other reagents can be used as to aminate the brominated DVB or other halogenated DVB in this step in the process according to the invention for making a fluorinated, amidated gel according to the invention.

Figure 4:
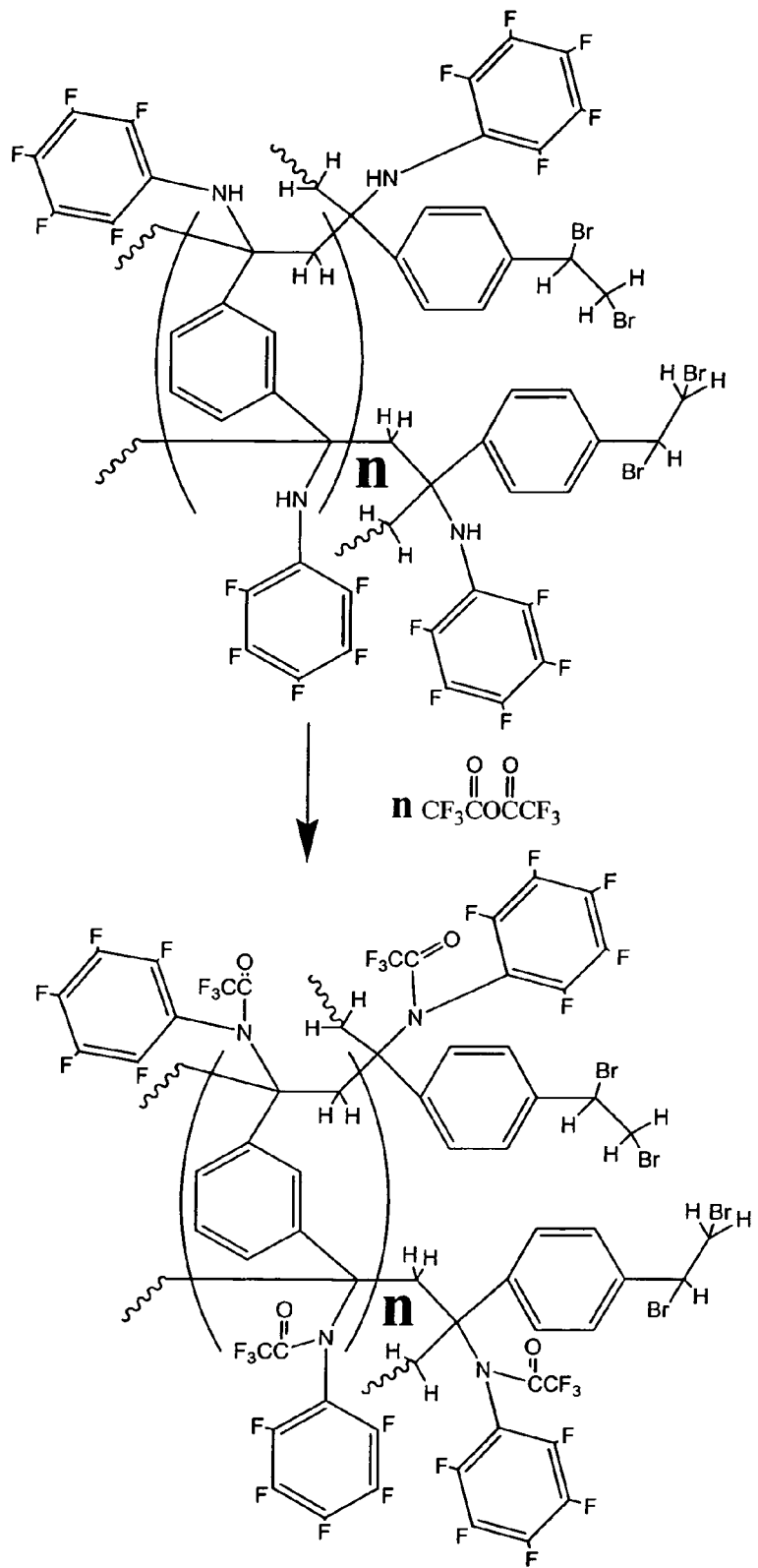
FIG. 4 is a schematic representation of amidation of the secondary amine-functionalized divinylbenzene, using trifluoroacetic anhydride, the third step in the process of making a composition according to an embodiment of the invention.
Figure 6:
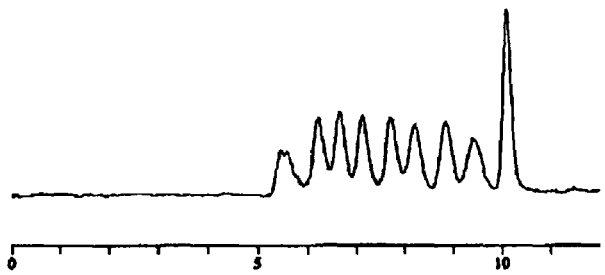
FIG. 6 is a prior art chromatogram showing SEC separation of the same nine standard polystyrenes at a flow rate of 3.0 ml/min in a 500 mm column and a pressure of 1650 psi.
Figure 9:
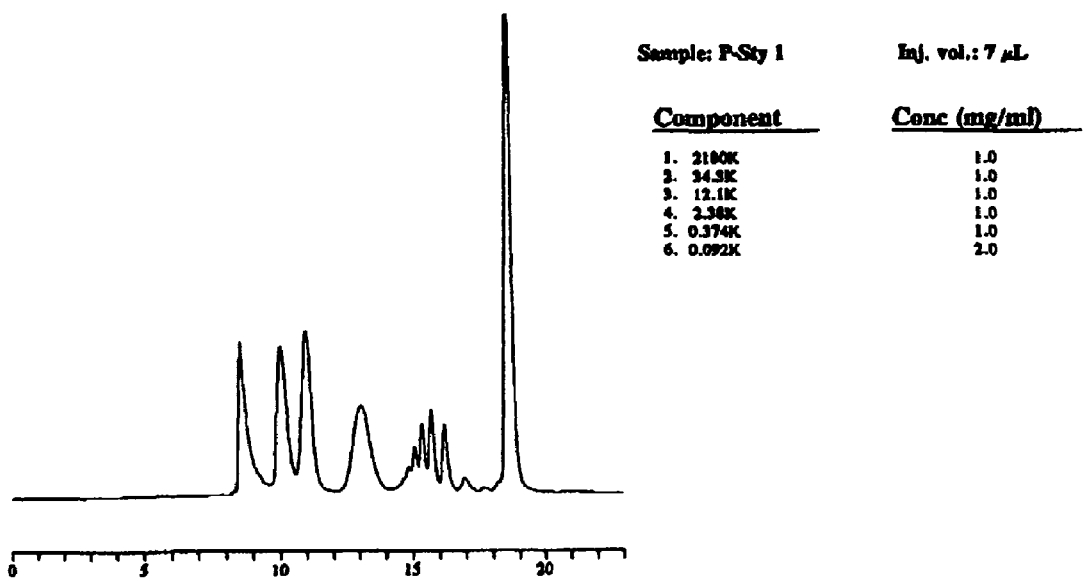
FIG. 9 is a prior art chromatogram showing SEC separation of six standard polystyrenes, using a small pore prior art gel composition at a flow rate of 1.5 ml/min.in a 500 mm column and a pressure of 1500 psi.

3) Amidation of the Secondary Amine Groups:

According to a method of the invention, the amidation of the secondary amine groups is accomplished using an anhydride as is displayed in FIG. 4. This is believed to be another nucleophilic substitution reaction wherein the secondary amine attacks the carbonyl group. The $CF_3O^-$ group is an excellent leaving group resulting in a very facile reaction. This results in the formation an amide group in place of the amine and greatly reduces the reactivity of the gel. This reaction also prevents the gel from serving as a hydrogen donor for hydrogen bonding interactions. What we have observed is a very sharp decrease in back pressure after the fluorinated anhydride is added in both SEC and HPLC columns. We believe this is due to a large decrease in the ability of the solvent to interact with the fluorinated stationary phase.

According to an embodiment of the invention, a preferred reagent used to amidate the brominated, aminated DVB is trifluoroacetic anhydride, as shown in FIG. 4. Other reagents suitable for use in the amidation reaction, all of which are available from Aldrich Chemical, are heptafluorobutyric anhydride;
pentafluoropropionic anhydride;
chlorodifluoroacetic anhydride;
trifluoroacetyl chloride;
pentafluorophenoxyacetyl chloride;
2,3,4,5,6-pentafluorobenzoyl chloride;
3-fluoro-5-(trifluoromethyl)benzoyl chloride;
2,3,4,5-tetrafluorobenzoyl chloride; and
pentadecafluorooctanoyl chloride.

Those of skill in the art will know, or will be able to ascertain with no more than routine experimentation, what other reagents can be used to amidate the brominated, aminated polymeric microbead surface.

Sizes of Microbeads of the Invention and Sizes of the Pores Thereon:

A composition of the invention is in the form of polymeric microbeads comprising a polymer with a modified surface which has been fluorinated or fluorinated and amidated according to a process of the invention. Assuming that the microbeads have a substantially spherical shape, the microbeads of the invention generally have a diameter of about 1 micron to about 20 microns. A preferred diameter is about 4 microns to about 10 microns. A most preferred diameter is about 4, 5, or 6 microns. In one embodiment, the diameters of the microbeads are non-uniform.

The diameter or size of the pores on the surface of the microbeads of the invention varies. "Size of the pores", or "pore size" as the terms are used herein, refers to the average diameter of the pores. The pores are believed to be non-uniform in diameter throughout their length. Some of the pores completely penetrate the microbead support. The pores of the support having a modified surface according to the invention comprise a mixture of pores capable of resolving materials from monomers to $10^7$ molecular weight.

Other Aspects

In another aspect, the invention relates to a column for analyzing mixtures of polymers of varying molecular weights, the column comprising microbeads according to the invention as described herein. The surface of any object made of a polymer, or coated with a polymer, for example a surgical forceps for handling biological tissue, can be coated with a composition according to an embodiment of the invention.

In another aspect, the invention relates to novel polymeric thin layers or membranes, plates, monoliths and the like comprising a polymer with a modified surface which has been either fluorinated, or fluorinated and amidated, according to a process of the invention. As the term is used herein, a "monolith" is a porous rod. An example of a polymeric membrane suitable for use in an embodiment of the invention may be from about 10 micrometers to about 100 micrometers in thickness. The term "polymeric sheet" generally refers to a sample of a polymer that is thicker than a polymeric thin layer membrane.

In yet another aspect, the invention relates to the product of the following two reaction steps described in detail generally, and more specifically in the exemplification section, Examples 1 and 2:

a) reacting a sample of polymeric microbeads, for example polydivinylbenzene or other polymers described herein as suitable starting polymers, with bromine, thereby forming at least one product of step a);

b) reacting the product of step a) with a fluorinated amine, thereby forming at least one product of step b). The product of these two reactions is useful as described herein to make the final fluorinated, amidated microbeads of the invention, and may have yet other uses.

In one embodiment of the invention, the fluorinated, amidated compositions provided on the surface of a disclosed modified polymer may include a plurality of repeating units such as, for example, the meta-substituted unit with the structure shown below as Formula I. Formula I:

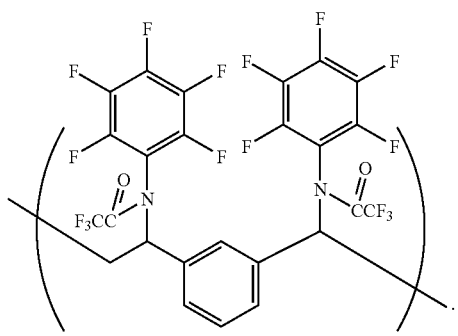

Para and ortho-substituted repeating units as described in the Summary may also form during the disclosed reactions. The repeating units continue until a terminal group, R is reached. R can be H, Cl, Br, F, Tosyl, and the like. For example, the end structure of a disclosed repeating unit may be as follows:

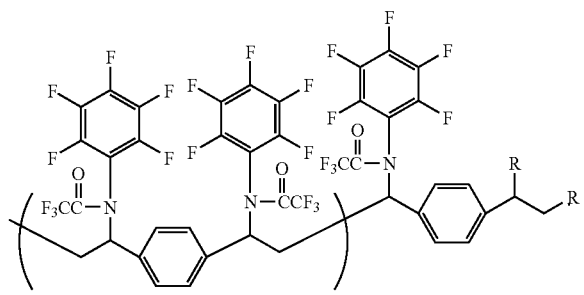

PARA ISOMER

According to an embodiment of the invention, the repeating units may also include a para-substituted group:

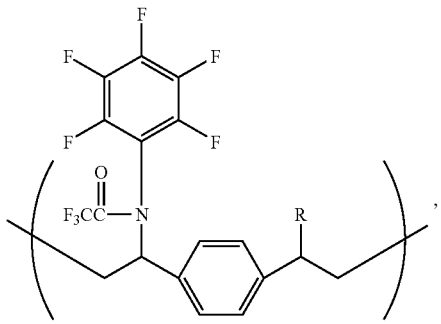

an ortho-substituted group such as:

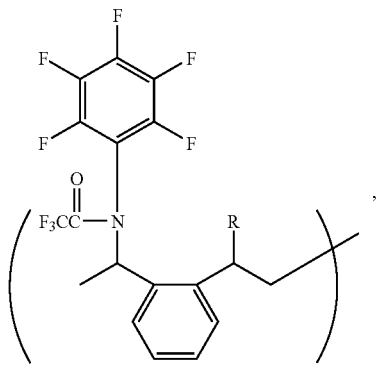

or a meta-substituted group such as

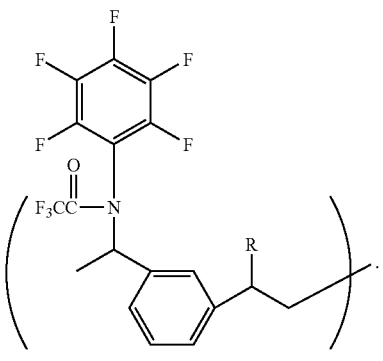

Some other terms that may be used herein:

Alkyl and alkane are intended to include linear, branched, or cyclic hydrocarbon structures and combinations thereof. Lower alkyl refers to alkyl groups of from 1 to 6 carbon atoms. Examples of lower alkyl groups include methyl, ethyl, propyl, isopropyl, butyl, s- and t-butyl and the like. Preferred alkyl groups are those of $C_{20}$ or below. Cycloalkyl is a subset of alkyl and includes cyclic hydrocarbon groups of from 3 to 8 carbon atoms. Examples of cycloalkyl groups include c-propyl, c-butyl, c-pentyl, norbornyl and the like. ($C_1$ to $C_n$) Hydrocarbon includes alkyl, cycloalkyl, alkenyl, alkynyl, aryl and combinations thereof containing only hydrogen and one to n carbons. Examples include vinyl, allyl, cyclopropyl, propargyl, phenethyl, cyclohexylmethyl, camphoryl and naphthylethyl. Saturated ($C_1$ to $C_n$)hydrocarbon is identical in meaning to ($C_1$ to $C_n$)alkyl or ($C_1$ to $C_n$)alkane as used herein.

Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, cyclohexyloxy and the like. Lower-alkoxy refers to groups containing one to four carbons.

Fluoroalkyl refers to alkyl residues in which one or more hydrogens have been replaced by fluorine. It includes perfluoroalkyl, in which all the hydrogens have been replaced by fluorine. Examples include fluoromethyl, difluoromethyl, trifluoromethyl, trifluoroethyl and pentafluoroethyl.

Oxaalkyl refers to alkyl residues in which one or more carbons (and their associated hydrogens) have been replaced by oxygen. Examples include methoxypropoxy, 3,6,9-trioxadecyl and the like. The term oxaalkyl is intended as it is understood in the art. (See *Naming and Indexing of Chemical Substances for Chemical Abstracts*, published by the American Chemical Society, 1997-2001, ¶127 and 128.) Oxaalkyl refers to compounds in which the oxygen is bonded via a single bond to its adjacent atoms (forming ether bonds); it does not refer to doubly bonded oxygen, as would be found in carbonyl groups. Similarly, thioalkyl and azaalkyl refer to alkyl residues in which one or more carbons has been replaced by sulfur or nitrogen, respectively. Examples include ethylaminoethyl and methylthiopropyl.

Acyl refers to groups of from 1 to 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxycarbonyl, benzyloxycarbonyl and the like. Lower-acyl refers to groups containing one to four carbons.

Aryl and heteroaryl mean a 5- or 6-membered aromatic or heteroaromatic ring containing 0-3 heteroatoms selected from O, N, or S; a bicyclic 9- or 10-membered aromatic or heteroaromatic ring system containing 0-3 heteroatoms selected from O, N, or S; or a tricyclic 13- or 14-membered aromatic or heteroaromatic ring system containing 0-3 heteroatoms selected from O, N, or S. As commonly understood, when referring to aryl as a substituent, it is intended that the point of attachment is a ring carbon of the aryl group (or ring carbon or heteroatom of the heteroaryl). For the purpose of the present invention, aryl and heteroaryl refer to systems in which at least one ring, but not necessarily all rings, are fully aromatic. Thus aromatic 6- to 14-membered carbocyclic rings include, e.g., benzene, naphthalene, indane, tetralin, benzocycloheptane and fluorene and the 5- to 10-membered aromatic heterocyclic rings include, e.g., imidazole, pyridine, indole, isoindoline, thiophene, benzopyranone, thiazole, furan, benzimidazole, quinoline, isoquinoline, tetrahydroisoquinoline, quinoxaline, tetrahydrocarboline, pyrimidine, pyrazine, tetrazole and pyrazole.

Alkylaryl means an alkyl residue attached to an aryl ring. As commonly understood, when referring to alkylaryl as a substituent, it is intended that the point of attachment is the alkyl group. Examples of $C_1$-$C_3$ alkylaryl are benzyl, phenethyl, phenylpropyl and naphthylethyl. Alkylheteroaryl means an alkyl residue attached to a heteroaryl ring. Examples include, e.g., pyridinylmethyl, pyrimidinylethyl and the like.

Heterocycle means a cycloalkyl or aryl residue in which from one to three carbons is replaced by a heteroatom selected from the group consisting of N, O and S. The nitrogen and sulfur heteroatoms may optionally be oxidized, and the nitrogen heteroatom may optionally be quaternized. It is to be noted that heteroaryl is a subset of heterocycle in which the heterocycle is aromatic. Examples of heterocyclyl residues additionally include piperazinyl, 4-piperidinyl, pyrazolidinyl, imidazolyl, imidazolinyl, imidazolidinyl, pyrazinyl, oxazolidinyl, isoxazolidinyl, thiazolidinyl, isothiazolyl, quinuclidinyl, isothiazolidinyl, benzimidazolyl, thiadiazolyl, benzopyranyl, benzothiazolyl, tetrahydrofuryl, tetrahydropyranyl, thienyl, benzothienyl, thiamorpholinyl, thiamorpholinylsulfoxide, thiamorpholinylsulfone, oxadiazolyl, triazolyl and tetrahydroquinolinyl.

Substituted alkyl, aryl, cycloalkyl, heterocyclyl etc. refer to alkyl, aryl, cycloalkyl, or heterocyclyl wherein up to three H atoms in each residue are replaced with loweralkyl, halogen, haloalkyl, hydroxy, hydroxymethyl, loweralkoxy, perfluoroloweralkoxy, carboxy, carboalkoxy (also referred to as alkoxycarbonyl), carboxamido (also referred to as alkylaminocarbonyl), sulfonamido, aminosulfonyl, alkylaminosulfonyl, cyano, carbonyl, nitro, amino, alkylamino, dialkylamino, ureido, alkylureido, mercapto, alkylthio, sulfoxide, sulfone, acylamino, amidino, phenyl, benzyl, heteroaryl, phenoxy, benzyloxy, or heteroaryloxy.

The term "halogen" means fluorine, chlorine, bromine or iodine.

The disclosed compositions provide enhanced stationary phases for use in normal phase, reverse phase, and size exclusion chromatography columns. The columns packed with the disclosed compositions can be used to achieve high speed separations with excellent resolution. Van Deemter curves can be used to compare the efficiencies of different liquid chromatography systems. Generally, a column will achieve the best chromatographic conditions at the lowest point, i.e., the lowest plate height, of the curves. The plate height is a function of peak broadening and peak shape, which are a function of several other factors.

Figure 17:
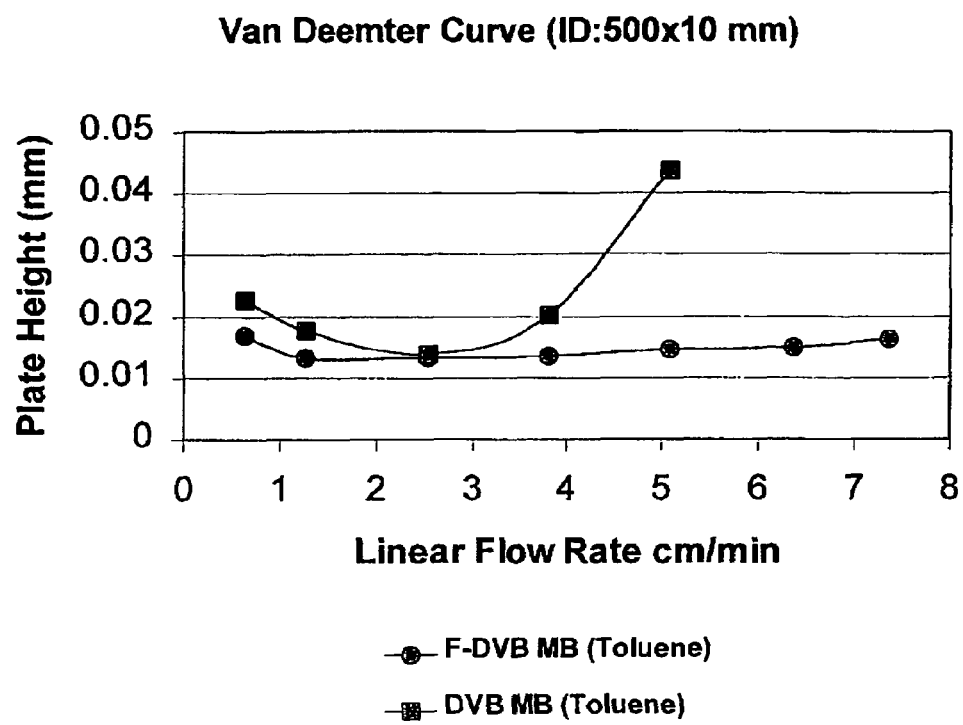
FIG. 17 is a Van Deemter curve depicting the plate height (Column length/number of plates) as a function of linear flow rate for a chromatogram (F-DVB MB) using a gel composition of the invention and a prior art chromatogram (DVB MB).

VanDeemter curves for a prior art chromatography column (DVB MB), and a disclosed chromatography column (F-DVB MB) of the invention, are provided in FIG. 17. A comparison of the two Van Deemter curves shows that the prior art column attains its best performance (minimum plate height) at a linear flow of about 2.5 cm/minute. However, the chart shows that the disclosed column, F-DVB MB attains its best performance at about 1.3 cm/minute and maintains this level of performance at much higher flow rates. Thus, the efficiency of the new column does not drop appreciably with increased flow rate. This conclusion is evident from the fact that the Van Deemter curve is nearly flat, as shown in FIG. 17. The columns using the compositions of the invention can run at higher flow rates than traditional columns without unacceptable shear stress on the samples.

In Van Deemter curves such as those shown in FIG. 17, the plate height is the column length divided by the "number of plates". The terms "number of plates" and "plate number" have the same meaning. The plate number is a dimensionless ratio, calculated from one of several equations, depending on what term is selected for an expression of peak width. The plate number denotes the column efficiency or performance. The larger the plate number, the more theoretical plates a column possesses.

EXEMPLIFICATION

Example 1

A Representative Example

Bromination of Base Polydivinylbenzene Gel

To 450 grams of 1000 A Jordi DVB gel (Jordi FLP, Bellingham, Mass.) was added 1500 mL of glacial acetic acid. The mixture was stirred until a homogeneous slurry. Then 10 grams of VAZO®67 (Dow) was added into above slurry. After stirring about 10 minutes at room temperature, the reaction temperature was increased to 75-80 Celsius degrees. At this time, another 10 grams of Vazo67 were added. Subsequently, 40 mL of bromine (liquid) was slowly added to above slurry dropwise with stirring. The reaction mixture was stirred overnight (around 16 hours) and then cooled to room temperature. The brominated gels were filtered and washed by 1000 mL water/methanol (20/80) twice and then methanol 2×1000 mL. The brominated Gels were dried at 70 Celsius degrees overnight to give 530 g brominated gel product according to the invention.

Example 2

A Representative Example

Amination of Brominated Gel

To a round-bottom flask was added brominated 1000 Å Jordi DVB gel (200 g) that was 10 μm in diameter followed by methanol (700 mL). The solution was then stirred until a homogeneous mixture was obtained. 2,3,4,5,6-Pentafluoroaniline (30 g) was then added and the mixture was stirred for one hour at room temperature. The temperature was then increased to 60-65° C. being careful not to exceed 75° C. and stirring was continued for sixteen hours. The mixture was allowed to cool and then filtered. Two portions of methanol (200 mL) and one portion of dichloromethane (300 mL) were then used to wash the filtered gel. The gel was then dried by conventional oven treatment at 60-70° C. for 6 hours to obtain 210 g of a light yellow colored powder.

Example 3

A Representative Example

Amidation of the Secondary Amine Groups

To a round-bottom flask containing 200 g of brominated gel which had undergone the amination procedure described above (Example 2) was added chloroform (600 ml). The mixture was then stirred until it was homogeneous. Then trifluoroacetic anhydride (20 mL) was added. The solution was then stirred for twenty four hours, after which it was filtered. The filtered gel was then washed with 2 portions of methanol (300 mL). The product is a fluorinated, amidated polydivinylbenzene gel comprising microbeads according to an embodiment of the invention.

Example 4

Prior Art Chromatograms

FIGS. 5, 6, 9, and 10, are prior art chromatograms showing the SEC separation of standard polystyrenes and toluene on a typical 5 micron polydivinylbenzene mixed bed column run at a flow rate of 1.5 ml/min, 3.0 ml/min, 1.5 m/min, and 4.0 ml/min, respectively, in a 500 mm column. Note that at 1.5 mL/min. the 7520K standard is partially sheared; (See FIG. 5 Prior Art.) while at 3.0 mL/min. the standard is severely sheared. (See FIG. 6 Prior Art.) This demonstrates how the prior art standard columns are incapable of running at high speed without causing shearing of high molecular weight polymer which makes them useless for high speed analysis.

We could not run the traditional 50 cm mixed bed column at 4.0 mL/min without exceeding the 2000 psi limit of the column, beyond which pressure the gel bed will collapse.

Example 5

New Invention Chromatograms

FIG. 7 and FIG. 8 are chromatograms showing SEC separations of the same eight standard polystyrenes and toluene as described previously, using a fluoroamidized gel of the invention at a flow rate of 1.5 ml/min and 3.0 ml/min., respectively, in a 500 mm column. As before, the gels were 5 micron polydivinylbenzene columns, but this time the gels were fluoroamidized according to a process of the invention. Unlike before, with the nonderivatised gels, the 7520K standard is still well resolved from the 1000K standard at 3.0 mL/min with a run time of the less than ten minutes for the separation of all nine standards. Thus these fluoroamidized gels appear to be usable at high flow rates for high speed SEC analysis.

FIG. 18 provides a comparison of flow rate, back pressure, assay time, and polymer shearing for four prior art columns and eight columns using the disclosed compositions.

Example 6

A Procedure to Make all Kind of Jordi Teflon Gels (1) 1000 A Jordi Teflon Gels [55-16, 1450 Fine, 1000 A]:

Step one: To 200 grams of Brominated 1000 A Jordi DVB gels (10 um diameter), add 700 ml of Methanol. Stir to be homogeneous, and then add 30 grams of pentafluoroaniline (Aldrich) into above slurry. Ater stirring one (1) hour at room temperature (at least one hour), the reaction temperature was increased to 60-65 C degree (do not exceed 75 C degree) and then the reaction mixture was stirred overnight (around 16 hours or more). The fluorinated gels were filtered and then washed by methanol twice and then DCM one time respectively. The fluorinated gels were dried at 60-70 C degree for 5-6 hours. Do not put the gel in the oven overnight. If heated too long the amine group might be oxidized and then could not be neutralized.

Step two: 600 ml of chloroform was added to above dried fluorinated gels. Stir to be homogeneous, and then add 20 ml of trifluoro acetic anhydride to neutralized amine groups on the surface of gels. After stirring four (4) hours at room temperature, the reaction temperature was increased to around 40-45 C degree and then the reaction mixture was stirred for additional two (2) hours. Another way is to stir the fluorinated gels in chloroform at room temperature for 24 hours. The fluorinated gel was filtered and then washed by methanol.

(2) 500 A Jordi Teflon Gels [1045 Coarse, 500 A]: The Procedure is the Same as Above.

(3) 10000 A Jordi Teflon Gels [1046 Coarse, 10000 A]: The Procedure is the Same as Above.

REFERENCES

The following references may be useful as background information.

1. Poole, C.; Poole, S. *Chromatography Today*, Elsevier, Amsterdam, (1991).
2. Solomon, G. *Organic Chemistry*, John Wiley & Sons, INC., New York, (1992).
3. Galia, M.; Svec, F.; Frechet, J. *Journal of Polymer Chemistry: Part A* 1994, 32, 2169.
4. Hosoya, K.; Frechet, J. *Journal of Liquid Chromatography* 1993, 16, 353.
5. Hosoya, K.; Frechet, M. *Journal of polymer Science: Part A* 1993, 31, 2139.
6. Dawkins, J.; Lloyd, L.; Warner, F. *Journal of Chromatography* 1986, 352, 157.
7. Lee, D. *Journal of Chromatography* 1988, 443, 143.
8. Bitteur, S.; Rosset, R. *Journal of Chromatography* 1987, 394, 279.
9. Dawkins, J.; Hemmin, M. *Die Makromolekulare Chemie* 1975, 176, 1815.
10. Coutinho, F.; Angelica, M.; Neves, F.; Dias, M. Journal of Applied Polymer Science: Part A 1997, 65, 1257.
11. Sasagawa, T.; Ericsson, L.; Teller, D.; Titani, K.; Walsh, K. *Journal of Chromatography: Biomedical Applications* 1984, 307, 29.
12. Tweeten, K.; Tweeten, T. *Journal of Chromatography* 1986, 359, 111.
13. Ng, J.; Froom, D. Canadian Chemical News 1998, 50, 24.
14. Thomson, B.; Rudin, A.; Lajoie, G. *Journal of Polymer Science: Part A* 1995, 33, 345
15. Lloyd, L. *Journal of Chromatography* 1991, 544, 201.
16. Colin, H.; Guiochon, G. *Journal of Chromatography* 1977, 141, 289.
17. Wongyai, S.; Bonn, G. *Journal of Chromatography* 1991, 536, 155.
18. Smigol, V.; Svec, F.; Frechet, J. *Journal of Liquid Chromatography* 1994, 17, 891.
19. Rounds, M.; Rounds, W.; Regneir, F. *Journal of Chromatography* 1987, 397, 25.
20. Leonard, M. *Journal of Chromatography* 1997, 699, 3.
21. Lewandowski, K.; Svec, F.; Frechet, J. *Journal of Liquid Chromatography and Related Technologies* 1997, 20, 227.
22. Wongyai, S.; Varga, J.; Bonn, G. *Journal of Chromatography* 1991, 536, 155.
23. Fournier, C.; Leonard, M.; Dellacherie,
24. E. International Journal of Biochromatography 1997, 2, 235.
25. Pasch, H.; Kilz, P. Macromol. Rapid
26. Communications 2003, 24, 104

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition comprising a plurality of repeating units at a support, and wherein the repeating units are the same or different and are independently chosen from the group consisting essentially of structures of Formula I, Formula II,
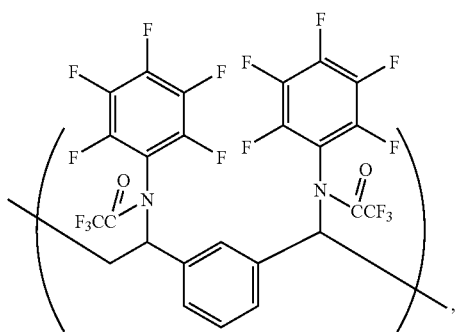
Formula III,
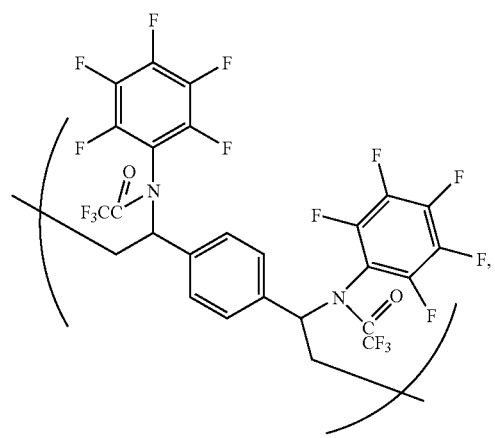
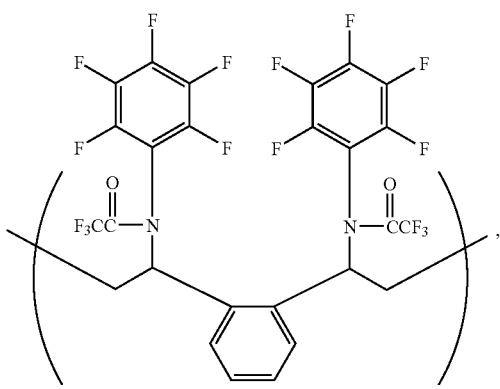
Formula IV,
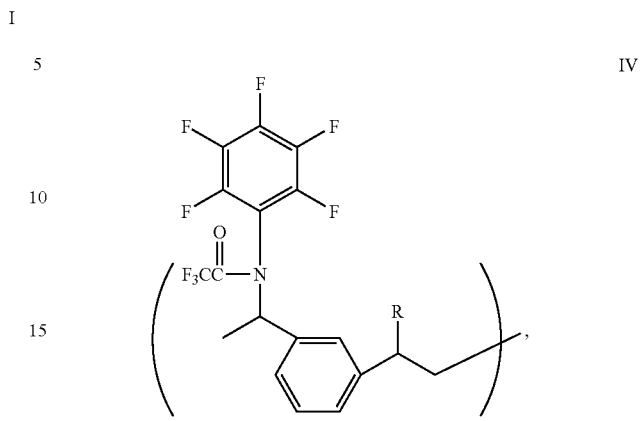
Formula V,
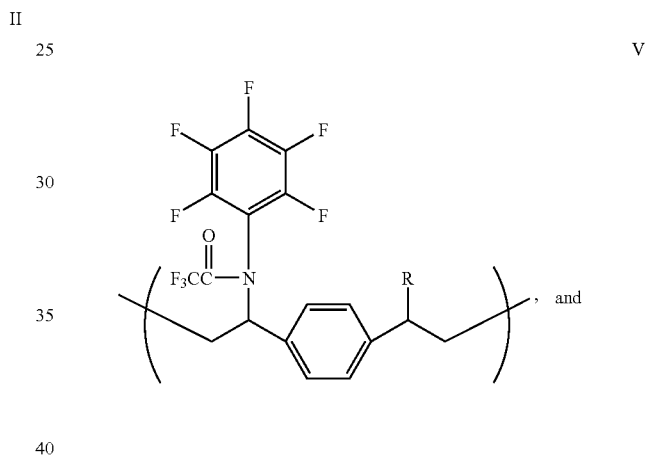
, and
Formula VI,
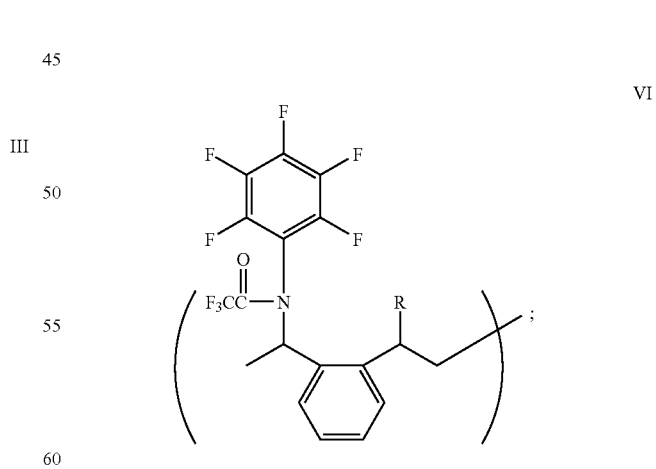
;
wherein R is chosen from H, Cl, Br, F, and tosyl.
2. The composition of claim 1, wherein the support is porous, and a portion of the repeating units covers a surface of the support, and another portion of the repeating units is within the pores of the support.

3. The composition of claim 1, wherein the support is a polymer or a copolymer chosen from polydivinylbenzene, polystyrene, polystyrene-polydivinylbenzene, polytrivinylbenzene, polymethylmethacrylate, polyethylene dimethacrylate, polymethacrylonitrile, polymethacrolein, polyvinylalcohol, polyacrylamide, polymers or copolymers of norbornene, and branched or straight-chain alkyl, optionally substituted with aryl or substituted aryl, and mixtures thereof.

4. The composition of claim 1, wherein the support is in the form of a sheet or a membrane.

5. The composition of claim 1, wherein the support is in the form of microbeads.

6. The composition of claim 5, wherein the microbeads have a diameter of about 1 micron to about 20 microns.

7. The composition of claim 5, wherein the microbeads have a diameter of about 4 microns to about 10 microns.

8. The composition of claim 6, wherein the diameters of the microbeads are non-uniform.

9. The composition of claim 2, wherein the pores of the support comprise a mixture of pores capable of resolving materials from monomers to $10^7$ molecular weight.

10. A column for analyzing mixtures of polymers of varying molecular weights, the column comprising microbeads according to claim 5.

11. A method for separating and analyzing a mixture of analytes in a polymer sample, the method comprising:
   a) packing a liquid chromatography column with a gel sample comprising at least one composition of claim 1;
   b) introducing the analyte sample and a solvent to the liquid chromatography column;
   c) applying pressure through a suitable pumping system;
   d) allowing the solvent to diffuse through the column; and
   e) monitoring the eluent with a detector; thereby separating the analytes of the polymer sample by a molecular weight distribution or by affinity for the stationary phase.

* * * * *